Dec. 28, 1954　　L. C. PEERY ET AL　　2,698,227
PREPARATION OF SYNTHESIS GASES FROM CARBONACEOUS SOLIDS
Filed Nov. 4, 1948
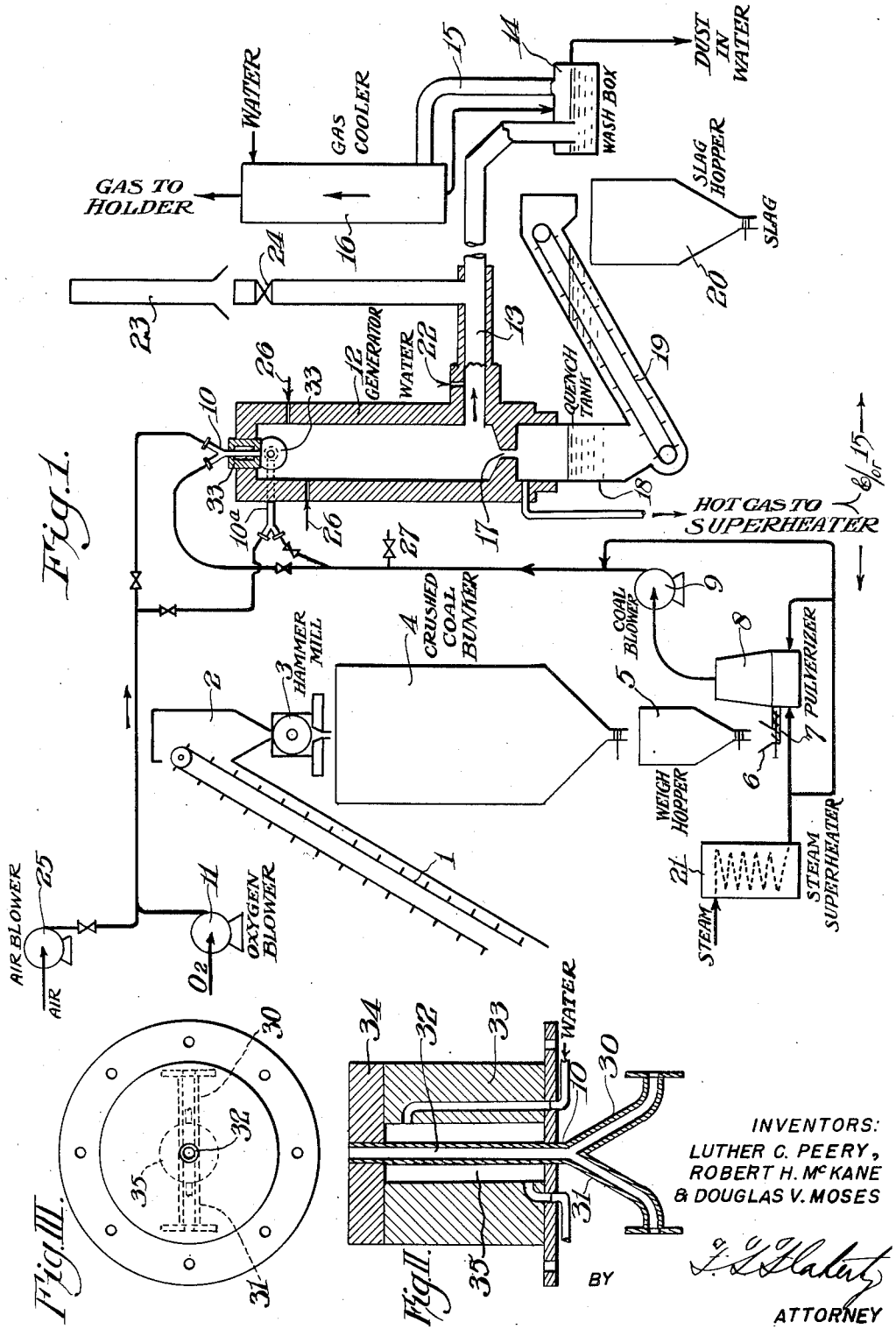
INVENTORS:
LUTHER C. PEERY,
ROBERT H. McKANE
& DOUGLAS V. MOSES
BY
ATTORNEY

United States Patent Office 2,698,227
Patented Dec. 28, 1954

2,698,227

PREPARATION OF SYNTHESIS GASES FROM CARBONACEOUS SOLIDS

Luther C. Peery, Robert H. McKane, and Douglas V. Moses, Charleston, W. Va., assignors to E. I. du Pont de Nemours & Company, Wilmington, Del., a corporation of Delaware Application November 4, 1948, Serial No. 58,212

5 Claims. (Cl. 48—206)

This invention relates to a process for the preparation of synthesis gases by the partial oxidation of comminuted solid carbonaceous materials, and is more particularly directed to the preparation of hydrogen, gaseous mixtures containing hydrogen and nitrogen, and gaseous mixtures containing hydrogen and carbon monoxide by the partial oxidation of powdered coal.

Many methods have been proposed for the preparation of synthesis gases of the above compositions, although for all intents and purposes the basic source of these gases is coal, petroleum oils, or natural gas. Synthesis gases are derived from these sources by pyrolysis, the coal is first coked, then gasified and the petroleum hydrocarbons and natural gas cracked. Cracking of petroleum oils for their synthesis gas content is uneconomical and this route is used only for the utilization of by-product gases. In recent years, natural gas and gases high in hydrocarbon content have been cracked to produce synthesis gases or reacted in accord with the hydrocarbon steam reaction to give such gases. The availability, however, of hydrocarbon gases, whether natural or synthetic, have somewhat limited the extent of this source. Coal remains and will remain for some time the principal source, in spite of the very inefficient processes normally used for extracting gases from coal.

To realize its synthesis gas content, coal is usually subjected to destructive distillation in retorts, the distilled gas being subjected to purification for the recovery principally of its hydrogen and olefin content; untreated the product gas has value only for its B. t. u. content. The coke residue from the retorts remains the principal source of synthesis gases, the hydrogen and carbon monoxide being obtained from the coke by alternate heating with air and blasting with steam, the purified gases from the steam run being used in the synthesis of ammonia, alcohol and other organic compounds.

The coke oven route to the preparation of a synthesis gas is very wasteful of raw material and wasteful of the heat content of the coal. Processes have been proposed whereby such gases are derived directly from coal without passing through the crude destructive distillation processes. Only a single process, however, the Winkler process, operated for a short time on brown coal in Oppau, Germany, appears to have used this route commercially. This process involved introducing oxygen and steam into a fixed fluidized bed of fine fuel, the bed acting much like a liquid in the boiling state. The agitation of the particles within the bed was maintained by the flow of gases through the bed. Operation of such a process, however, is difficult for care must be exercised in the control of gas velocities to maintain the bed in a fluidized state, otherwise blow holes form and unreacted oxygen passes the bed causing explosions, rough operation and local damage. Difficulties and inefficiencies also arise from excessive fuel carry-over in the product gas. No commercially acceptable process, accordingly, is extant in the United States in which synthesis gases containing low inerts and low methane concentrations are produced directly from coal without passing through the costly destructive distillation step in coke ovens.

An object of the present invention is to provide an improved process for the preparation of synthesis gas mixtures from coal. Another object is to provide a process for the preparation of gases containing principally hydrogen, carbon monoxide and hydrogen, or hydrogen and nitrogen, wherein the purity and/or the ratio of constituents can be accurately controlled. A further object is to provide a process for the partial combustion of solid carbonaceous fuels, such as powdered coal, by a simple and highly efficient process. Other objects and advantages of the invention will hereinafter appear, and will be more fully understood by reference to the specification and to the accompanying drawings which diagrammatically illustrate a preferred form and assemblage of apparatus in which the reaction takes place.

The apparatus illustrated in the drawings may be used for the thermal partial decomposition by oxidation of hydro-carbonaceous solids generally and coal more particularly.

Fig. I illustrates the apparatus in which the process of the invention is carried out, and in which coal is pulverized, then suspended in superheated steam, which suspension is thoroughly mixed with oxygen, or oxygen fortified air, and the resulting mixture subjected to partial combustion. The gaseous products are separated from the slag and ash produced during the partial combustion of the powdered coal, and then are treated for the preparation of a gas of hydrogen, of hydrogen and carbon monoxide, or of hydrogen and nitrogen. Essentially all of the ash content of the coal is removed from the furnace as liquid slag. The series of operations illustrated provide an overall process for producing a highly efficient and economical conversion of the volatile matter and fixed carbon in coal, its oxidation products, together with decomposition products of steam to synthesis gas mixtures.

In Fig. I, conveyor 1 transports coal into hopper 2 of a hammer mill 3 wherein any lumps of coal are crushed. From hammer mill 3 the crushed coal drops into bunker 4, from the bottom of which in turn the crushed coal is fed by gravity to weighing hopper 5 and into the metering device 6 with screw feed 7, which forces a measured portion of the crushed coal into a steam pulverizer 8 wherein the crushed coal is comminuted and the product picked up by steam which transports it as a steam-coal fluid stream impelled by blower 9 into high velocity jet burner 10 or 10a, burner 10 being directed axially and downwardly into the gas generator 12, and burner 10a being directed tangently into the upper section of the generator 12. In burner 10 the steam-coal mixture is combined with oxygen of at least 90% purity which is forced into the burner by blower 11. The coal-steam-oxygen mixture issues from burner 10 into gas generator 12 in which the mixtures of gases is ignited. The gaseous products of ignition flow from gas generator 12 through conduit 13 to wash box 14, the washed gases issuing from wash box 14 through conduit 15 and gas cooler 16 to a suitable gas holder not shown. The slag produced in gas generator 12 flows through a tapping hole 17 provided in the bottom of the gas generator 12 and drops into the water held in quench tank 18. The tapping hole 17 may, if desired, be located in the wall at the side rather than at the bottom of the generator 12 as shown, and may vary between about $\frac{1}{50}$ to $\frac{1}{100}$ of the furnace cross-section. The port of the tapping hole 17 is kept hot and free of slag plugs by withdrawing from about 10 to 25% of the product gas through this port. This hot gas may, if desired, be passed through the steam superheater 21 to preheat the entering steam and/or returned to the main product gas stream via an auxiliary blower not shown. From the bottom of quench tank 18 the slag is lifted by means of conveyer 19 to slag hopper 20. Steam is introduced into the system from superheater 21 from which it is passed into the pulverizer 8, and, if desired, may be introduced into the steam entrained coal after it passes blower 9. Cooling water is sprayed into generator gases at 22 prior to passing them into the wash box 14. A flare stack 23 and valve 24 is provided for discharge of the gases produced during start-up, shut-down or control during periods of unsteady operation.

Figs. II and III illustrate, in detail, the construction of the high velocity jet burners 10 and 10a in which the steam-coal suspension from one arm 30 of the burner meets the oxygen from the other arm 31 in the mixing chamber 32. The material of construction of mixing chamber 32 is preferably stainless steel tubing or other metal resistant to high temperatures, chamber 32 being encased in castable fire brick refractories 33 and 34. A water jacket 35 on the mixing chamber 32 is desirable to prevent fusion of the tip when the hot furnace is shut down.

The hammer mill is adjusted to crush the lump coal to a size of ¼″ or less, and this crushed coal is then dropped into the pulverizer 8 wherein it is ground to a product approximately 90% or more of which will pass through a 200 mesh U. S. standard screen. Any suitable type of mechanical pulverization may be used. The known commercial steam jet type pulverizers are especially well adapted for this particular operation because the pulverized coal after grinding is entrained in steam substantially at one and the same time, and passed from the pulverizer as a steam-coal fluid mixture, the coil being suspended by a sufficient quantity of steam flowing at a sufficient velocity to carry the coal to the burner.

To start the reaction, gas generator 12 and auxiliary piping are brought up to temperature by burning natural gas or other fuel introduced into the high velocity jet burner at 27. This fuel is mixed with oxygen or air and burned within the generator 12 until the generator reaches a uniform temperature of about 1000° C. to 1200° C. When this temperature has been attained, coal and steam is introduced into the fuel stream and the ratio of steam-coal suspension gradually increased over a period of about an hour, at the end of which time substantially all auxiliary fuel flow is cut off. Commencing operation in this manner minimizes explosion hazards in gas generator 12. During normal opeartion of the process, the temperature within the combustion zone is held above 1200° C. and preferably above 1400° C., the maximum temperature at the chamber wall being between 1300° and 1700° C., the temperature being adjusted inter alia by control of rates of oxygen and coal ingestion. Flashback of the flame into the burner is avoided providing a high fluid velocity is maintained in the jet burner 10 at all times. This velocity should be 100 feet per second for nozzles having diameters up to ¾″ with velocities of at least 150 feet per second and preferably above 300 feet per second for larger nozzles. During the start-up period and after the interior temperature of the generator 12 has reached 1200° C. and the fuel is slowly replaced by the steam-coal mixture, a complete replacement is effected without hazardous flash-back difficulties, if the proper velocities are maintained.

The partial combustion of the comminuted coal may be operated with either up-flow, down-flow or side-flow of the steam-coal-oxygen mixture into the gas generator 12. Down-flow, as illustrated, either in axial or tangential direction, is preferred since it has been found that the temperatures throughout the length of the furnace are more nearly equal when the flow is in this direction, while a very short, high temperature zone may be encountered in an up-flow operation. Slag removal problems are also minimized with down-flow operation.

The steam has a five-fold function to perform; first, to pulverize the coal in steam pulverizer; second, to transport the coal as an entrained stream from the pulverizer to the high velocity jet burner; third, to provide an incipient distillation of volatile material from the coal; fourth, to limit and control the reaction temperature; and fifth, to serve as reactant in the process. It is essential that the coal be maintained after comminution above the dew point of its moisture content in order to prevent precipitation within the conduits leading to the high velocity jet burner. When operating at temperatures only slightly above the dew point, the optimum advantages of the process are not realized, for it has been found that if the steam temperature is increased to a temperature above that at which incipient distillation of volatile materials from the coal occurs, this distillation facilitates ignition and subsequent partial combustion of the coal. As is well known, most bituminous coals reach a plastic state at a temperature of about 400° C., in which state the coal is quite sticky and difficult to transport without clogging of equipment. As a consequence, the steam-coal stream is preferably maintained at a temperature between 200 and 400° C., and preferably between 250 and 350° C.

To insure sufficient steam to carry the coal, the amount of steam should range between 0.5 to 1.5 pounds per pound of coal, depending to a large extent upon the height necessary to carry and to lift the coal from the pulverizer to the burner and on the resultant velocities in the transport lines. The steam supplied to the pulverizer should be under a pressure between 80 and 150 p. s. i. g., and preferably between 100 and 110 p. s. i. g., the blowers 9, 11 and 25 operating to deliver fluids at pressures between 1.0 and 5.0 p. s. i. g. Auxiliary steam in excess of pulverizer requirements may be supplied, if desired, at low pressure between .5 and 10 p. s. i. g.

One of the outstanding features of the invention rests in the premixing of the steam-coal suspension with oxygen prior to partial combustion of the coal content of the mixture. Mixing chamber 32 is so designed, with respect to length and cross-sectional area, and the steam-coal suspension entering the chamber simultaneously with the oxygen at such velocities, that the combining fluids set up a high degree of turbulence within the chamber, whereby thorough and uniform mixing is accomplished. To attain this result the chamber should have a length of at least 25 chamber diameters.

The oxygen introduced into the burner should be of not appreciably less than 90% purity, preferably above 95% purity, and is used in sufficient amounts to give steam-oxygen mixtures containing from 25 to 50 (mol percent) oxygen, and preferably from 30 to 40 (mol percent) oxygen based on the steam-oxygen mixture. Many factors such as fuel composition and relative proportions of coal and steam influence the amount of oxygen required. With constant steam and coal flows, an increase in oxygen over that stoichiometrically required decreases the hydrocarbon leakage, increases the furnace temperature and reduces the $H_2/CO$ ratio in the product gas. It has, likewise, been found that loss of heat through combustion chamber walls increases inordinately the excess oxygen requirement, and conversely preheating the inlet gas and powdered fuel decreases the oxygen requirement for maintaining the hydrocarbon leakage essentially at zero.

If desired, steam or nitrogen (as pure nitrogen or flue gas) may be introduced at any point such, for example, as through auxiliary inlet 26 into the ignited gas in the generator 12 in order to lower the combustion temperature and act to quench the product gases. If steam is introduced, it, at one and the same time, increases the hydrogen content of the gas due to the decomposition of steam in accord with the water gas reaction and the hydrocarbon steam reactions which take place. While the temperature is not optimum for these reactions, nevertheless, it apepars that they do occur, even under these rather unfavorable conditions. Nitrogen may be introduced at such point to give a final nitrogen containing gas and also to cool the combustion gases. Whether the steam is introduced as a single stream with the powdered fuel or partially with the fuel and partially into the converter itself, the same overall ratio of steam to powdered fuel should be maintained. If desired, the product gas containing nitrogen can be produced by using air introduced by air blower 25 into the oxygen. The air diluted oxygen mixture is combined in the high velocity jet burner 10 with the steam-coal stream. To produce a product gas for use in the synthesis of ammonia, the oxygen is diluted with air in an amount sufficient to give a product gas containing a hydrogen to nitrogen ratio of about 3. Inasmuch as the nitrogen content of the air introduced on a weight basis is the same as that found in the product gas, simple stoichiometric calculations will determine the optimum ratio of air to coal to be employed to give the desired nitrogen content in the product gas, whether the nitrogen be introduced via air, or other nitrogen carrier, or into whatever part of the system the nitrogen or nitrogen carrier gas is introduced. Some small amounts of nitrogen will at times be introduced with the commercial oxygen and hydrocarbonaceous fuel, and this, of course, should be considered in the calculations.

If steam is to be used to quench the product gas and increase the $H_2/CO$ ratio, it is preferably used in a steam to coal weight ratio ranging between 0.1 to about 1.0, and preferably between 0.2 and 0.5. This will decrease the furnace temperature at the point of steam addition, and likewise produce a gas containing a higher ratio of hydrogen to carbon monoxide.

In the table which follows preferred embodiments of the process of the invention are further exemplified. The combustion vessel used in operating in accord with the processes of the table comprises a furnace shell of three superimposed and lined cylindrical sheet steel sections bolted together each 3 feet high with a 30 inch outside diameter and an 8 inch inside diameter. The reaction zone had a refractory one inch inside lining of silicon carbide, a refractory four inch layer made of "Alfrax" alumina brick, and between this refractory and the steel shell a four inch layer of Armstrong A-25 insulating brick and a two inch layer of "Firecrete" castable insulation. The burner jet consisted of a three-quarter inch stainless steel throat 32 with the arms 30 and 31 of the burner being constructed of one-half inch stainless steel pipe, pipe 32 being encased in a refractory 33.

The apparatus was operated at an average rate of about 1.6 to 1.9 pounds of powdered coal introduced per minute, with 190 to 230 standard cubic feet per minute of product gas produced per square foot of cross-sectional area, and a maximum throughput of about 240 cubic feet per minute per square foot. The inside refractory temperature averaged about 1500° C., at which temperature no refractory fusion occurred.

Table

| Pds. of Powdered Coal/Hr. | Super-heated Steam Temp., °C. | $O_2$/Steam Mixture, Percent $O_2$ | Air, C. F. M. | Furnace Temp., °C. | Product Gas in Volume, Percent | | | | | |
|---|---|---|---|---|---|---|---|---|---|---|
| | | | | | $N_2$ | CO | $H_2$ | $CO_2$ | $CH_4$ | Ill. |
| 96 | 215 | 47.3 | -------- | 1,550 | 2.5 | 43.7 | 33.6 | 19.6 | 0.4 | 0.2 |
| 96 | 200 | 50.2 | -------- | 1,400 | 3.0 | 44.9 | 34.3 | 16.6 | 0.9 | 0.1 |
| 96 | 210 | 48.4 | -------- | 1,520 | 2.4 | 47.8 | 29.0 | 20.6 | 0.2 | 0.3 |
| 96 | 265 | 47.0 | -------- | 1,550 | 0.3 | 43.0 | 40.1 | 16.1 | 0.5 | 0.0 |
| 96 | 215 | 45.6 | -------- | 1,550 | 2.4 | 43.4 | 33.7 | 20.2 | 0.3 | 0.0 |
| 114 | 240 | 35.7 | -------- | 1,450 | 3.2 | 38.3 | 44.2 | 13.9 | 0.3 | 0.0 |
| 114 | 245 | 35.1 | -------- | 1,375 | 3.3 | 35.1 | 46.5 | 14.9 | 0.2 | 0.0 |
| 114 | 240 | 37.0 | -------- | 1,400 | 2.7 | 43.5 | 44.8 | 8.7 | 0.3 | 0.0 |
| 114 | 245 | 35.1 | -------- | 1,375 | 3.6 | 35.9 | 44.6 | 15.6 | 0.3 | 0.0 |
| 60 | 240 | 36.0 | 11.5 | 1,400 | 18.5 | 32.9 | 33.9 | 13.0 | 1.6 | 0.1 |
| 60 | 250 | 35.7 | 15.5 | 1,400 | 26.6 | 27.0 | 36.7 | 8.8 | 0.2 | 0.7 |

The product gas obtained by the partial oxidation of the pulverized fuel may be used directly after its withdrawal from the gas cooler 16, or may be further treated in order to prepare it for use in the synthesis of methanol, in which a gaseous mixture of carbon monoxide and hydrogen is used; or to prepare it for use in the synthesis of ammonia, in which a gaseous mixture of nitrogen and hydrogen is used; or to prepare it for use as a hydrogenation gas in which only its hydrogen content is used. Known methods may be used for treating the gaseous mixtures to give such synthesis gas mixtures or a process used such as that described in the copending application of L. C. Peery and R. H. McKane, S. N. 37,614, filed July 8, 1948.

We claim:

1. A process for the preparation of a synthesis gas containing carbon monoxide and hydrogen from pulverized coal which comprises suspending pulverized coal in superheated steam, mixing the coal-steam suspension, in a non-ignited state, with a sufficient amount of oxygen of at least 90% purity to convert the coal to carbon monoxide and hydrogen but insufficient to convert the coal to carbon dioxide and water, passing the suspension, with the steam superheated and the coal at a temperature such that it is under incipient distillation, into a combustion zone, in a non-ignited state, and at a sufficiently high velocity to prevent flash-back of the flame into the suspension during mixing, and in said zone subjecting the suspension to partial combustion at a temperature between 1200 and 1700° C.

2. A process for the preparation of a synthesis gas containing hydrogen and carbon monoxide from pulverized coal and oxygen which comprises suspending pulverized coal in superheated steam at a temperature between 200 and 400° C., thoroughly mixing the steam-coal suspension with oxygen of at least 90% purity, and in sufficient amounts to provide a 30 to 40 mol per cent oxygen based on the steam/oxygen mixture, at a temperature below combustion temperature, passing the suspension, with the steam superheated and the coal at a temperature such that it is under incipient distillation, into a combustion zone, in a non-ignited state, and at a sufficiently high velocity to prevent flash-back of the flame into the suspension during mixing, and in said zone subjecting the suspension to partial combustion at a temperature between 1200 and 1700° C.

3. A process for the preparation of a synthesis gas containing carbon monoxide and hydrogen from pulverized coal which comprises suspending pulverized bituminous coal that reaches a plastic state at a temperature of about 400° C., in superheated steam, mixing the coal-steam suspension, in a non-ignited state, with a sufficient amount of oxygen of at least 90% purity to convert the coal to carbon monoxide and hydrogen but insufficient to convert the coal to carbon dioxide and water while the mixture is flowing at a velocity of at least 150 feet per second, and thereafter as a coal-steam-oxygen suspension of uniform composition, introducing the suspension, in which the steam is superheated, at said velocity into a combustion zone maintained at a temperature between 1200 and 1700° C.

4. In a process for the preparation of synthesis gases containing carbon monoxide and hydrogen by the partial combustion of coal with substantially pure oxygen, the steps which comprise preparing a uniform suspension of pulverized coal in steam, thoroughly mixing that suspension with oxygen of better than 90% purity and in amount sufficient to convert the coal to carbon monoxide and hydrogen, but insufficient to convert the coal to carbon dioxide and water; maintaining the suspension of coal and the steam and the suspension of coal, steam, and oxygen at a temperature above the dew point of their moisture content but below the temperature at which the coal is plastic; and passing the coal-steam-oxygen suspension into a reaction zone wherein the coal is subjected to a partial combustion reaction in the presence of the steam to give synthesis gases.

5. In a process for the preparation of synthesis gases containing carbon monoxide and hydrogen by the partial combustion of coal with substantially pure oxygen in a combustion zone, the steps which comprise suspending pulverized coal of a size approximately 90% of which will pass through a 200 mesh U. S. Standard Screen in superheated steam; thoroughly mixing the resulting coal-steam suspension with sufficient oxygen of better than 90% purity to provide a suspension of the coal and steam in the oxygen to convert by partial oxidation the coal to carbon monoxide and hydrogen but insufficient oxygen to convert the coal by said reaction to carbon dioxide and water, the steam carrying a sufficient degree of superheat to maintain the suspensions above their dew point but below the temperature at which the coal is plastic; thoroughly and uniformly mixing the coal-steam-oxygen suspension in a mixing zone of uniform cross-section having a length of at least 25 diameters and an axis coextensive with the axis of the suspension as it is forced from the mixing zone into the combustion zone; and thereafter, passing the mixture into the combustion zone at a sufficiently high velocity to prevent flash-back of the flame from said combustion zone back into said mixing zone.

References Cited in the file of this patent

UNITED STATES PATENTS

| Number | Name | Date |
|---|---|---|
| 1,758,630 | Trent | May 13, 1930 |
| 1,924,856 | Heller | Aug. 29, 1933 |
| 2,385,508 | Hammond | Sept. 25, 1945 |
| 2,388,348 | Stimson | Nov. 6, 1945 |
| 2,515,542 | Yellott | July 18, 1950 |
| 2,516,974 | Garrison | Aug. 1, 1950 |
| 2,554,263 | Nelson | May 22, 1951 |
| 2,594,312 | Kerr et al. | Apr. 29, 1952 |
| 2,644,745 | Hemminger | July 7, 1953 |

(Other references on following page)

UNITED STATES PATENTS

FOREIGN PATENTS

| Number | Country | Date |
|---|---|---|
| 8,239 | Great Britain | Mar. 10, 1900 |
| 413,130 | Great Britain | July 12, 1934 |

OTHER REFERENCES

Haslam et al., "Fuels and Their Combustion," 1st ed., 1926, page 455.

"Production of Manufactured Gas Using Gas Turbine Cycles," Jenny, reprint, Chemical Eng., Apr. 1948, 4 pages.

"Gas Journal," vol. 203 (1933), page 95.